Jan. 13, 1953  J. F. G. PETIT  2,625,674

DYNAMOELECTRIC MACHINE

Filed April 27, 1949  2 SHEETS—SHEET 1

INVENTOR.
JEAN FRANCOIS GABRIEL PETIT
BY
Haseltine, Lake & Co.
AGENTS

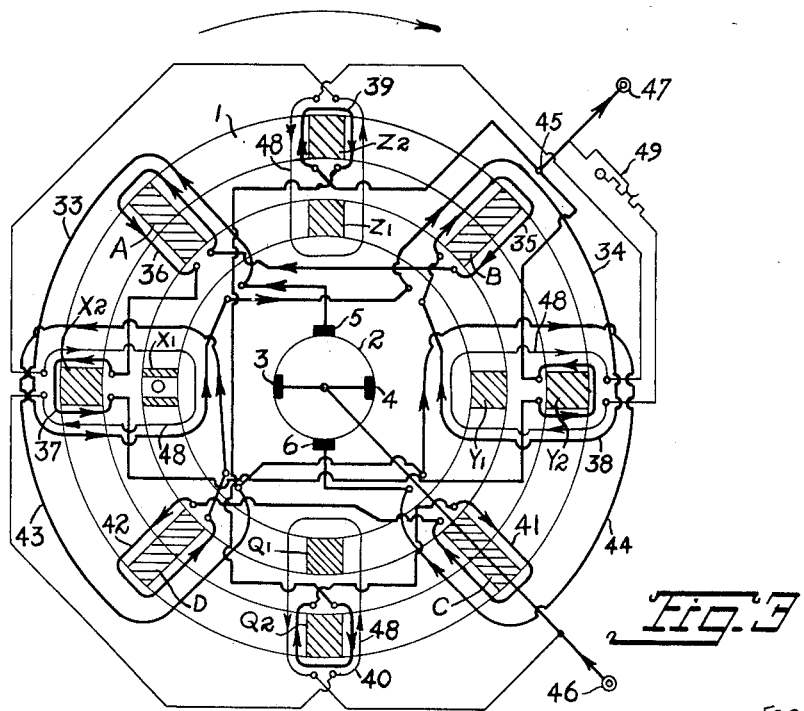
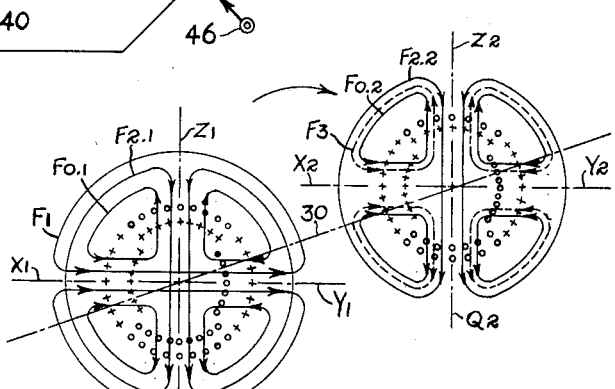
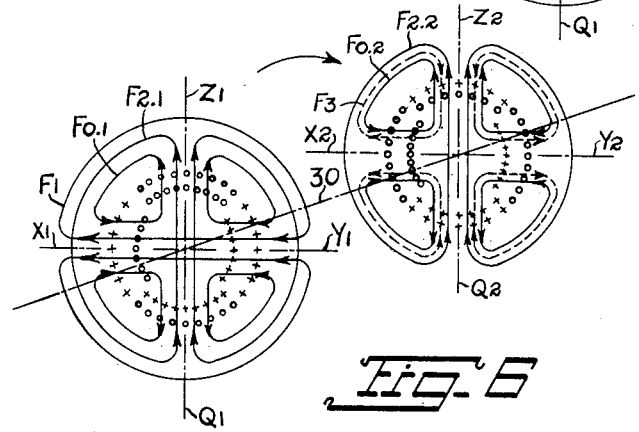
INVENTOR.
JEAN FRANCOIS GABRIEL PETIT
BY
Haseltine, Lake + Co.
AGENTS Patented Jan. 13, 1953

2,625,674

UNITED STATES PATENT OFFICE 2,625,674

DYNAMOELECTRIC MACHINE

Jean François Gabriel Petit, Paris, France, assignor to Societe d'Exploitation de Brevets, Boulogne-sur-Seine, France, a corporation of France Application April 27, 1949, Serial No. 90,018
In France April 29, 1948

6 Claims. (Cl. 322—25)

My invention relates to dynamoelectric machines and particularly to machines adapted to be used for the control of other machines, either as generators or as exciters.

An object of my invention is to devise a dynamo-electric machine in which a particular design of the field structure provides for a definite and stable comparison standard, whereby the machine may be used to perform control or regulating functions.

Another object of my invention is to provide a dynamoelectric machine which is adapted to be used as a regulator-exciter for another machine.

A further object of my invention is to provide a self-regulated generator.

A still further object of my invention is to provide a dynamoelectric machine with highly sensitive regulating properties.

Other objects and advantages of my invention will become apparent from the following description referring to the accompanying drawing in which like parts are designated by like reference numbers on all figures. In the drawing:

Fig. 3 is the circuit diagram of another embodiment of the invention.

Figs. 5 and 6 are explanatory diagrams relating to the embodiment of Figs. 3 and 4.

For purposes of convenience the machines herein represented are of the four-pole type; it should be noted, however, that the invention is equally applicable to machines having a number of poles which is different and in particular multiple of four.

Figure 1:
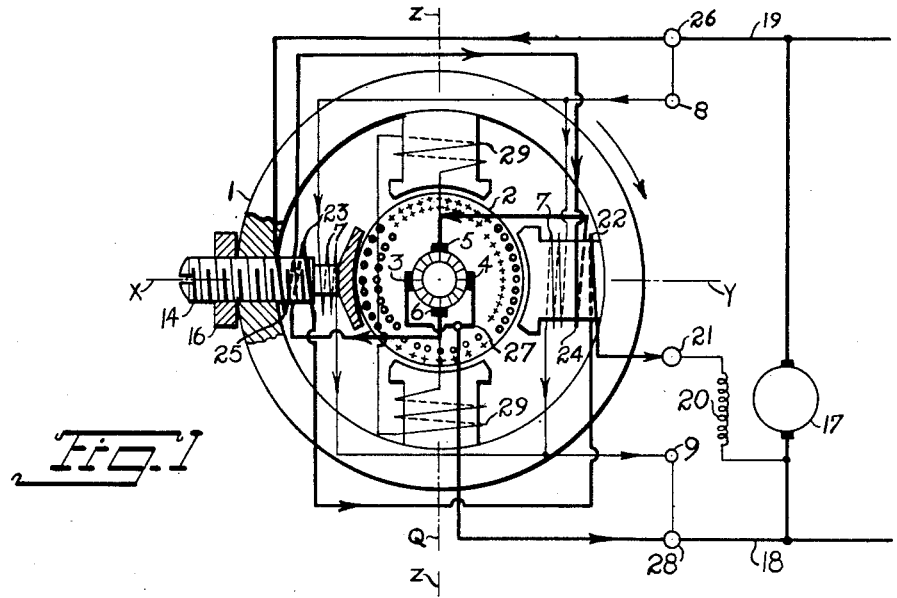
Fig. 1 is a diagrammatic view of a four-pole machine adapted to operate as a regulator-exciter for another machine.

Fig. 1 illustrates the machine used as a combined regulator-exciter for keeping constant the voltage of a shunt wound generator 17 supplying current leads 18 and 19. One end of the field coil 20 of the generator is connected to current lead 18 while its other end is connected to current lead 19 indirectly through a circuit of the regulator-exciter which comprises a terminal 21, two compensating coils 22 and 23 arranged on poles Y and X and serially connected in a circuit lead extending from terminal 21 to secondary brush 6, and two compensating coils 24 and 25 arranged on poles Y and X and serially connected in a circuit lead extending from secondary brush 5 to a terminal 26 to which is attached current lead 19. The four compensating coils 22—25 are adapted to act cumulatively along axis XY under energization by secondary circulating current flowing between terminals 21 and 28 in order to oppose the secondary armature reaction flux.

The primary brushes 3 and 4 have between them a circuit connection or cross-connection 27 which is connected to a terminal 28 to which current lead 18 is attached. The poles Z and Q comprise, preferably but not necessarily, an auxiliary field exciting winding 29 connected across secondary brushes 5 and 6 and arranged for producing a component of magnetic excitation cumulatively with the primary armature reaction flux due to primary circulating current between brushes 3 and 4.

The regulation winding 7 is shown as comprising two sections arranged on poles X and Y and parallel connected across terminals 26 and 28.

The distribution of the several elemental currents which will flow in the peripheral conductors of the armature during operation of the machine will be indicated by an equal number of layers of signs (+) and (0), which respectively denote a current flowing into or out of the figure.

The operation is as follows:

The generator 17, driven by a suitable motor, is assumed to build up with current lead 18 and 19 being negative and positive respectively. The regulation winding 7 subject to increasing voltage of the generator produces a four-pole magnetization of the field structure and the armature also subject to this voltage is caused to rotate for example clockwise.

Assuming $I_a$ is the total current entering the regulator-exciter at terminal 26 and brush 5, $I_{ex}$ the current drawn at brush 6 by the field coils 20 and $I_3$ the current coming out at brushes 3 and 4 to return to terminal 28, these three currents comply with the relation $I_a = I_{ex} + I_3$.

Due to unequal loading of brushes 5 and 6 there will flow between them a secondary circulating current $$I_2 = \frac{I_a + I_{ex}}{2}$$

Both above relations give $$I_a = I_2 + \frac{I_3}{2}$$

and $$I_{ex} = I_2 - \frac{I_3}{2}$$

The current $I_3$ whose distribution in the armature winding is shown by the external layer of signs (+) and (0) is equally distributed between the four brushes and is used to drive the armature. The current $I_2$ flowing in the secondary circuit of the armature winding as indicated by the intermediate layer of signs (+) and (0) produces a secondary armature reaction flux along the axis XY of the regulation flux.

The detrimental effect of this secondary armature reaction flux is counteracted by means of compensating windings 22—25, which for this purpose are alternately disposed on poles Y and X to act cumulatively as regards secondary current $I_2$ to oppose the secondary armature reaction flux and differentially as regards current $I_3$.

Since the voltage of generator 17 has not yet reached the value, say U, for which the total ampere-turns produced by winding 7 have the value U' at which the fluxes from the poles X and Y are balanced, there exists a component of regulation flux directed from X toward Y, which induces in the armature primary circuit an E. M. F. $E_1$ which appears across brushes 3 and 4. This primary E. M. F. $E_1$ causes a primary circulating current $I_1$ to flow in connection 27 from brush 4 to brush 3 i. e. in the reverse direction to that shown by the inner layer of signs (+) and (0). This primary current produces a primary armature reaction flux which extends along axis ZQ from Z toward Q. This primary armature reaction induces across secondary brushes 5 and 6 a difference in potential or secondary E. M. F. $E_2$ which raises the absolute potential of brush 6 relatively to the means potential of primary brushes 3 and 4 and therefore tends to increase current $I_{ex}$ in field coil 20. The auxiliary field exciting winding 29 produces upon energization by secondary E. M. F. $E_2$ a component of magnetic excitation which assists the primary armature reaction flux in increasing current $I_{ex}$.

As a result the voltage of generator 17 quickly reaches the value U while the regulation flux decreases and finally becomes zero as well as the E. M. F.'s $E_1$ and $E_2$ so that field coil 20 is now energized upon voltage U, except the IR drop between terminals 21 and 26.

If the voltage of the generator tends to overshoot the value U, the regulation flux now rises in the opposite direction i. e. from Y toward X and induces in the armature a current $I_1$ whose direction is shown by the inner layer of signs (+) and (0). The resulting primary armature reaction flux now directed from Q toward Z induces across the secondary brushes an E. M. F. $E_2$ with a reverse sign which lowers the absolute potential of brush 6 relatively to the mean potential of brushes 3 and 4, whereby current $I_{ex}$ is reduced and the voltage of the generator is kept back to its rated amount U.

If for any reason the voltage of the generator becomes lesser than U, the regulation flux reappears again in the direction from X toward Y for strengthening current $I_{ex}$.

The regulation process is identical when the generator 17 builds up with a reverse polarity. Current $I_{ex}$ flows in the opposite direction, but the direction of rotation of the regulator-exciter remains the same, whereby an increase of the generator voltage above U results in the production of a regulation flux directed from X toward Y and a primary reaction flux directed from Z toward Q, which latter tends to lower the absolute potential of brush 6 relatively to the mean potential of brushes 3 and 4, thereby decreasing current $I_{ex}$ and keeping the generator voltage to its normal amount U.

It is therefore seen that in order to obtain an effective regulation, the load circuit for the machine, coil 20 in the present instance, should be connected between the connection 27 and the secondary brush whose potential varies in inverse relationship to the excitation of regulation winding 7.

The regulator-exciter just described can be considered as incorporating three superimposed elemental machines with common armature, namely, a first two-pole generator excited by the regulation flux to produce a once amplified voltage across primary brushes, a second two-pole generator excited by the armature reaction flux to the first generator to produce across secondary brushes a twice amplified voltage which is used to oppose the cause of the regulation flux, and a four-pole motor using both primary and secondary brushes and driving both first and second generators.

The machine therefore comprises two amplifying stages and a driving stage.

Such an arrangement renders the regulator-exciter mechanically independent from the machine to which it is electrically coupled.

The machine just described can readily operate as a self-regulated generator supplying a constant voltage. For this purpose and with clockwise rotation it is only necessary to connect terminal 8 to terminal 21 instead of terminal 26, the constant output voltage being available across terminals 21 and 28. The machine may be self-driven by connecting any suitable source of electrical power across terminals 26 and 28, or separately driven with a source of mechanical power. This latter arrangement is illustrated in Fig. 2.

Figure 2:
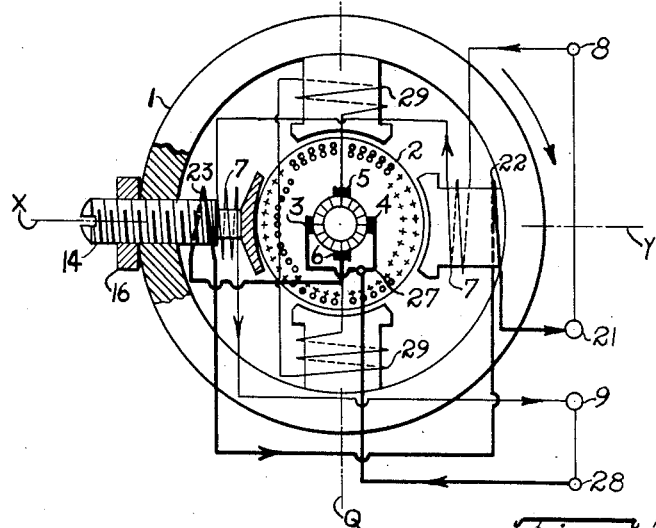
Fig. 2 shows the same machine for use as a self-regulated generator.

The circuit which leads from brush 5 to terminal 26 is not used and therefore is omitted in Fig. 2. The regulation winding is shown as comprising two sections arranged on poles X and Y and serially connected across terminals 8 and 9. The operation is the same as for Fig. 5. The armature being rotated, the machine builds up due to its residual magnetism, with terminals 21 and 28 being for example positive and negative respectively. The magnetizing ampere-turns having not yet reached the value U' there exists a regulation flux directed from X toward Y and a primary armature reaction flux directed from Z toward Q which raises the absolute potential of brush 6 together with the generated voltage across terminals 21 and 28. When the normal voltage U corresponding to ampere-turns U' is reached both latter fluxes become zero. Overshooting of the output voltage causes these fluxes to re-appear with a reverse direction, thereby decreasing the absolute potential of brush 6 together with the output voltage of the machine.

For any other regulation purposes the regulation winding of the machine will be energized upon current or voltage related to the condition to be regulated.

With the machine above described the corrective action of the regulation flux is amplified twice before using it to counteract the initial cause of the flux unbalance by which it is generated.

The case will be now described with reference to Figs. 3 to 5 of a four-pole self-regulated machine, in which the corrective action of the regulation flux is amplified three times.

Referring now to Fig. 3 the machine comprises a field structure or stator 1 and an armature 2.

The armature 2, which comprises two separate cores or lamination packs, is provided with a commutator and a winding which may be the same as in the former machine.

The stator 1 comprises a first set of four poles $X_1$, $Y_1$, $Z_1$ and $Q_1$ respectively identical with poles X, Y, Z and Q of the former machine and a second set of auxiliary poles $X_2$, $Y_2$, $Z_2$ and $Q_2$ juxtaposed with the poles of the first set.

The armature 2 is normally mounted within the stator in order for the two lamination packs to form with both sets of poles two separate magnetic circuits.

The stator may comprise four interpoles A, B, C and D.

The circuits of the machine are shown in Fig. 3 in which, for purposes of convenience, both magnetic circuits have been illustrated as having the form of concentric cylinders at right angle to the figure; the poles are indicated by shaded areas and the armature is assumed to be shaped as a disk located below the figure.

The primary circuit of the armature winding is completed through cross-connection 27 while the secondary circuit thereof is completed through an internal circuit including a plurality of coils, more clearly shown in Fig. 4, the order of sequence of which may be as follows, the letter N or S attached to each reference number denoting the magnetic polarity imparted by the corresponding coil due to a current flowing from brush 5 to brush 6: brush 5—compensating coils 33(S) and 34(N) arranged about poles A, $X_2$, $X_1$ and poles B, $Y_2$, $Y_1$—commutation coils 35(N) and 36(S) on poles B and A field exciting coils 37(S), 38(S), 39(N) and 40(N) on poles $X_2$, $Y_2$, $Z_2$ and $Q_2$—commutation coils 41(N) and 42(S) on poles C and D—compensating coils 43(S) and 44(N) arranged about poles D, $X_2$, $X_1$ and poles Y, $Y_2$, C—brush 6.

The cross connection 27 and the midpoint 45 of the internal circuit are respectively connected to load terminals 46 and 47.

The field structure of the machine is also provided with a regulation winding 48 distributed on all pairs of juxtaposed poles and serially connected across terminals 46 and 47 for providing alternate polarities on all pairs of juxtaposed poles. Preferably a tuning resistor 49 is inserted in series therewith to permit adjustment of the operating point of the machine.

The elemental currents in the armature conductors and the flux from which they result are indicated in Figs. 5 and 6 on two separate diagrams related to each separate magnetic circuit, the diagrams of Fig. 5 being used in the case where the ampere-turns of regulation winding 48 are below the above defined value U' and those of Fig. 6 in the case where these ampere-turns tend to overshoot the value U'.

The operation of the machine as a generator is as follows, with first neglecting the effect of compensating and commutation coils:

The machine, assumed to be connected to a load circuit (not shown) and driven clockwise from a suitable source of mechanical power, builds up with terminals 46 and 47 being for example negative and positive respectively.

The regulation winding 48 upon energization by the voltage across terminals 46 and 47 produces a four-pole magnetization $F_0$ whose distribution is shown at $F_{0.1}$ and $F_{0.2}$ in Figs. 5 and 6.

The machine operating below the value U' of the magnetizing ampere-turns, reference will be had to Fig. 5 which shows a component of regulation flux $F_1$ directed from $X_1$ toward $Y_1$. This flux $F_1$ induces in the armature winding a primary current $I_1$ materialized by the inner layer of signs (+) and (0), which produces a primary armature reaction $F_2$ whose distribution is shown at $F_{2.1}$ and $F_{2.2}$.

This flux $F_2$ induces in the armature a secondary current $I_2$, materialized by the intermediate layer of signs (+) and (0), which flows in the internal circuit in the reverse direction to that shown by the arrows. Upon energization by current $I_2$ the field exciting coils 37 to 40 strengthen the four-pole magnetization component $F_{0.2}$, as shown by the broken line $F_3$ (Fig. 5).

The increasing voltage generated by the machine causes a load current $I_3$ to flow in the armature winding, as shown by the external layer of signs (+) and (0), the internal circuit portion including coils 39 to 44 carrying a current $$I_2 - \frac{I_3}{2}$$

and the remaining portion carrying a current $$I_2 + \frac{I_3}{2}$$

The purpose of the alternate arrangement of coils 37 to 40 is to provide cumulative excitations of these coils upon energization by the component $I_2$ and differential excitations upon energization by current $I_3$, whereby the strengthening effect of these coils upon the four pole magnetization $F_{0.2}$ is only due to current $I_2$.

When the magnetizing ampere-turns reach the value $at_0$ corresponding to a given amount U of the load voltage, the currents $I_1$ and $I_2$ and the fluxes $F_1$ and $F_2$ become zero and the machine operates as a normal four-pole generator.

If the load voltage tends to overshoot the above value, the magnetizing ampere-turns rise to a value $at_2$ greater than $at_0$ which results, as shown in Fig. 6, in causing fluxes $F_1$ and $F_2$ to build in the reverse direction thereby producing a strengthening effect $F_3$ on the four pole magnetization $F_{0.2}$ and keeping back the output voltage to its rated value U.

The compensating coils 33, 34, 43 and 44 are mainly provided to oppose the secondary armature reaction flux due to current $I_2$, which otherwise would interfere with the regulation flux.

Figure 4:
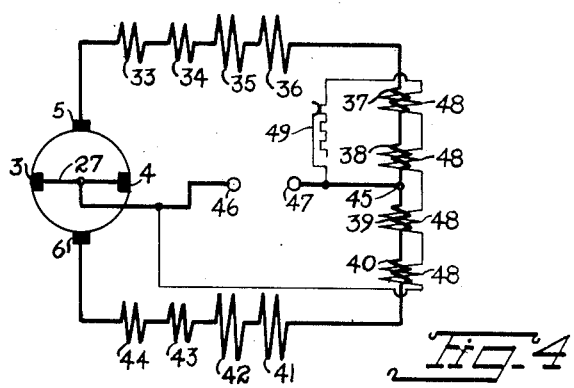
Fig. 4 is a simplified representation thereof.

As shown in Figs 3 and 4 the purpose of the alternate arrangement of these compensating coils is to render their ampere-turns independent from load current $I_3$, but only in the common area embraced by the portions of these coils which overlap on poles $X_1$, $X_2$ on the one hand and $Y_1$, $Y_2$ on the other hand, while their portions which extend up to interpose A, B, C and D produce auxiliary ampere-turns depending both from currents $I_2$ and $I_3$.

The auxiliary ampere-turns due to current $I_2$ generate in the secondary armature circuit an E. M. F. which assists secondary current commutation, while the ampere-turns due to current $I_3$ generate an E. M. F. which assists load current commutation.

The commutation coils 35, 36, 41 and 42 produce ampere-turns which also depend from currents $I_2$ and $I_3$ and complete the action of the above auxiliary ampere-turns, thereby permitting of a substantial saving in copper and coils space of commutation coils.

It is to be understood that the invention is not limited to the particular arrangements disclosed which have been given for purposes of illustration only, and that modifications thereof may be made without departing from the spirit of the invention. Thus the substantially constant flux produced by a saturated pole can also be produced by a magnet which will be substituted therefor, the regulation taking place about the intersection point of the horizontal characteristic of the magnet pole and the inclined portion of the magnetization characteristic of the nonsaturated pole.

What I claim is:

1. In a system for regulating a condition of operation of an electric generator provided with a controllable field circuit, a dynamoelectric machine comprising a field structure with four poles to be excited with alternate magnetic polarities, a parallel wound armature with a commutator and four brushes arranged relatively to said poles to assume alternate electric polarities, two of said brushes of one polarity being related to the poles of one polarity and constituting primary brushes while the two other brushes are related to the poles of the other polarity and constitute secondary brushes, said primary and secondary brushes providing through the armature a primary circuit and a secondary circuit respectively, said two poles of one polarity being constructed to have different degrees of magnetic saturation, means for exciting one of said two poles of one polarity up to saturation to produce therein a substantially constant flux, control field excitation means energized in dependence upon the condition to be regulated and producing in the other of said two poles of one polarity a flux variable over a range including said substantially constant flux, the fluxes in these two poles being equal for a definite value of control excitation and alternately preponderant for alternate inferior and superior values of control excitation and effecting between said two poles a controllable reversible component of flux unbalance which induces a corresponding difference in potential between said primary brushes, a circuit connection arranged between said primary brushes to be energized by primary armature circulating current in order to induce an amplified difference in potential between said secondary brushes, circuit means for supplying the generator output voltage from one of said secondary brushes to said circuit connection to cause rotation of the machine, and circuit means for connecting the other secondary brush with one terminal of the generator through the field circuit thereof so as to control the current in said field circuit with said amplified difference in potential.

2. In a system for regulating the output voltage of an electric generator provided with field excitation means including a shunt field winding, a dynamoelectric machine comprising a field structure having four poles arranged in a manner to be excited with alternate magnetic polarities, a four pole parallel wound armature with a commutator and four brushes arranged relatively to said poles to assume alternate electric polarities, two of said brushes having one polarity being related to the poles of one polarity and constituting primary brushes while the two other brushes are related to the two poles of other polarity and constitute secondary brushes, said primary and secondary brushes providing through the armature a primary circuit and a secondary circuit respectively, the two poles of said one polarity being constructed to have different degrees of magnetic saturation, control field excitation windings energized in dependence upon the generator output voltage and arranged on said structure to excite the one of said two poles of one polarity having the lower degree of magnetic saturation up to saturation to produce therein a substantially constant flux and to excite the other pole below saturation to produce a variable flux in the latter, the fluxes in said two poles being equal for a definite value of the generator output voltage and alternately preponderant for alternate inferior and superior values of said voltage to provide between said two poles a controllable reversible component of flux unbalance which induces a corresponding difference in potential between said primary brushes, a primary connection between the primary brushes to induce an amplified difference in potential between the secondary brushes under excitation by primary armature reaction, circuit means for supplying the generator output voltage from one secondary brush to said primary connection to cause rotation of the machine, circuit means for connecting the other secondary brush with one terminal of the generator through the shunt winding thereof so as to control its field current with said amplified difference in potential, and auxiliary windings arranged on said field structure and energized in dependence upon secondary circulating current to oppose the secondary armature reaction.

3. A dynamoelectric machine comprising a field structure with two juxtaposed sets of four main poles and four auxiliary poles respectively arranged to be excited in a manner attaining alternate magnetic polarities, a parallel-wound armature with a commutator and four brushes arranged relatively to said poles to assume alternate electric polarities, two of said brushes being of one polarity and related to two of said main poles of one polarity to constitute primary brushes while the two other brushes are related to the two other main poles of the other polarity and constitute secondary brushes, said primary and secondary brushes providing through the armature a primary circuit and a secondary circuit respectively, said two main poles of said one polarity being constructed to have different degrees of magnetic saturation, control field excitation means associated with said field structure and producing balanced fluxes in said two poles for a definite value of excitation, said balanced fluxes being equal to the magnetic saturation of the one of said two main poles of one polarity having the lower degree of magnetic saturation, said control field excitation means producing alternately preponderant fluxes in said two main poles of said one polarity for values of excitation which are greater than and less than said definite value of excitation and thereby providing a controllable reversible component of flux unbalance which induces a corresponding difference in potential between said primary brushes, a circuit connection arranged between said primary brushes to be energized with primary circulating current in order to induce an amplified difference in potential between said secondary brushes, another circuit connection between said secondary brushes to excite the four auxiliary poles with secondary circulating current generated by said amplified difference in potential, means for connecting a load circuit between said circuit connections and compensating windings energized in dependence upon said secondary circulating current to produce a flux in opposition to secondary armature reaction.

4. A direct-current generator comprising a field structure with two juxtaposed sets of four main poles and four auxiliary poles respectively arranged to be excited in a manner providing alternate magnetic polarities and four interpoles, a parallel-wound armature with two juxtaposed magnetic cores, a commutator and four brushes arranged relatively to said poles to assume alternate electric polarities, two of said brushes being of one polarity and related to the main poles of one polarity to constitute primary brushes and the two other brushes being of the other polarity and related to the main poles of the other polarity to constitute secondary brushes, said primary and secondary brushes providing through the armature a primary circuit and a secondary circuit respectively, said two main poles of said one polarity being constructed to have different degrees of magnetic saturation, control field excitation windings energized by the generator output voltage and arranged on said field structure to produce balanced fluxes in said two poles of said one polarity of a value equal to the saturation of the one of said two poles having the lower degree of magnetic saturation for a definite value of excitation and alternately preponderant fluxes for values of excitation which are greater than and less than said definite value of excitation so as to provide a controllable reversible component of flux unbalance, said flux unbalance inducing a corresponding difference in potential between said primary brushes, a circuit connection between said primary brushes for varying the relative strength of said poles of the other polarity with primary circulating current in order to induce an amplified difference in potential between said secondary brushes, another circuit connection arranged between said secondary brushes and including four series connected coils arranged on said auxiliary poles and four secondary armature reaction compensating coils of which two are disposed about a main pole of said one polarity and the auxiliary pole juxtaposed thereto, a load circuit connected between said circuit connections, said field coils and compensating coils being arranged to act cumulatively as regards said secondary circulating current and differentially as regards load current, and four commutating coils series connected in said other circuit connection for assisting commutation of secondary and load current.

5. A direct-current regulating machine having a field structure with several poles successively alternating in polarity, a parallel-wound armature and commutator brushes associated with said poles, two of said poles having the same polarity and being constructed to have different degrees of magnetic saturation, one of said two poles having a normally saturated flux path so as to produce a substantially constant flux, the other of said two poles having a normally unsaturated flux path adapted to produce under excitation by a variable condition a flux variable over a range including the value of said substantially constant flux, said two poles being equal and opposite in strength for a definite value of said condition, the flux of said two poles effecting a flux unbalance in response to any departure of said condition from said definite value which unbalance is correlated in magnitude and sign to said departure and induces between the equipolar brushes associated with said two poles a corresponding circulating current, and circuit means associated with the armature for controlling said variable condition in response to said circulating current in such a manner as to reduce said flux unbalance in order to secure regulation of said variable condition.

6. A direct-current machine for regulating a variable condition controllable in dependence upon the current distribution in an electric circuit, said machine having a field structure with two first poles of one polarity, and two other poles of the other polarity and a parallel wound armature with two equipolar interconnected primary brushes associated with said two first poles and two equipolar secondary brushes associated with said two other poles, said two first poles being constructed to have different degrees of saturation, said variable condition being operatively connected to said field structure so that the more readily saturable of said two first poles is normally excited up to saturation to produce a substantially constant flux while the less readily saturable of said two first poles is normally excited below saturation in dependence upon the said variable condition, the four pole flux of the machine having a symmetrical distribution for a definite value of the variable condition, the flux of said two first poles effecting a flux unbalance in response to any departure of the variable condition from said definite value, and said flux unbalance inducing between said secondary brushes a corresponding primary circulating current correlated in magnitude and sign to said departure, the secondary brushes being interconnected through said electric circuit so that the current distribution in this latter circuit is controlled by the secondary circulating current induced by primary armature reaction.

JEAN FRANÇOIS GABRIEL PETIT.

REFERENCES CITED

The following references are of record in the file of this patent:

UNITED STATES PATENTS

| Number | Name | Date |
| --- | --- | --- |
| 1,650,851 | Rosenberg | Nov. 29, 1927 |
| 2,163,418 | Tisza et al. | June 20, 1939 |
| 2,184,766 | Harding | Dec. 26, 1939 |
| 2,428,621 | Fisher | Oct. 7, 1947 |
| 2,482,483 | Harris et al. | Sept. 20, 1949 |
| 2,484,840 | Liwschitz et al. | Oct. 18, 1949 |
| 2,525,404 | Dolan | Oct. 10, 1950 |